(12) United States Patent
Bettoli

(10) Patent No.: US 8,932,967 B2
(45) Date of Patent: Jan. 13, 2015

(54) COMPOSITION FOR COLOURING GLASS AND USES THEREOF

(71) Applicant: Michele Bettoli, Faenza (IT)

(72) Inventor: Michele Bettoli, Faenza (IT)

(73) Assignee: Vetriceramici S.p.A., Casola Valsenio (Ravenna) (IT)

( * ) Notice: Subject to any disclaimer, the term of this patent is extended or adjusted under 35 U.S.C. 154(b) by 17 days.

(21) Appl. No.: 13/772,945

(22) Filed: Feb. 21, 2013

(65) Prior Publication Data

US 2013/0217559 A1    Aug. 22, 2013

(30) Foreign Application Priority Data

Feb. 21, 2012  (EP) ..................... 12425036

(51) Int. Cl.
| | |
|---|---|
| *C03C 8/24* | (2006.01) |
| *C03C 8/14* | (2006.01) |
| *B32B 15/00* | (2006.01) |
| *B32B 17/06* | (2006.01) |
| *C03C 1/04* | (2006.01) |
| *C03C 4/02* | (2006.01) |
| *C03C 1/10* | (2006.01) |
| *C09C 1/34* | (2006.01) |
| *C09C 1/00* | (2006.01) |

(52) U.S. Cl.
CPC ... *C03C 1/04* (2013.01); *C03C 4/02* (2013.01); *C03C 1/10* (2013.01); *C09C 1/343* (2013.01); *C09C 1/0081* (2013.01); *C01P 2006/62* (2013.01); *C01P 2006/63* (2013.01); *C01P 2006/64* (2013.01)
USPC ............................... 501/17; 501/15; 428/432

(58) Field of Classification Search
CPC ............. C03C 8/02; C03C 8/14; C03C 8/24; C03C 8/04
USPC .................. 501/14, 15, 17, 21; 428/426, 432
See application file for complete search history.

(56) References Cited

U.S. PATENT DOCUMENTS

| | | | |
|---|---|---|---|
| 1,411,134 A |   | 3/1922 | Taylor |
| 3,561,985 A | * | 2/1971 | Hall et al. ........................ 501/66 |
| 3,619,218 A | * | 11/1971 | Hagedorn et al. ............ 252/589 |
| 3,844,796 A |   | 10/1974 | Jasinski |
| 3,928,050 A |   | 12/1975 | Jasinski |
| 3,955,991 A |   | 5/1976 | Young et al. |
| 6,936,556 B2 | * | 8/2005 | Sridharan et al. ............... 501/14 |
| 6,984,597 B2 | * | 1/2006 | Ackerman ...................... 501/27 |

* cited by examiner

*Primary Examiner* — Noah Wiese
(74) *Attorney, Agent, or Firm* — Lucas & Mercanti, LLP

(57) ABSTRACT

The present invention relates to a coloring composition free of nickel oxide. In particular, the coloring composition for glass comprises manganese dioxide ($MnO_2$), chromium oxide (III) ($Cr_2O_3$), cobalt oxide ($Co_3O_4$) and a glass medium. Furthermore, the present invention relates to the process for producing the coloring composition and the use thereof for the purpose of imparting a dark color (black), in particular a blue-violet-black color, to the glass.

20 Claims, No Drawings

COMPOSITION FOR COLOURING GLASS AND USES THEREOF

CROSS-REFERENCE TO RELATED APPLICATIONS

This application claims the benefit of priority from European Patent Application Serial No. 12425036.6, filed Feb. 21, 2012, the contents of which are incorporated herein by reference.

FIELD OF THE INVENTION

The present invention relates to a coloring composition free of nickel oxide and the use thereof for coloring glass.

BACKGROUND OF THE INVENTION

Colored glass is produced by adding very small amounts of coloring substances to the vitrifiable mixture. In particular, coloring mixtures are added to the transparent glass matrix during the glass melting step by means of dispensers into which the colorant is loaded, usually in the form of granules or tablets.

The colorants used in this sector are mainly metal oxides, in particular oxides of transition metals.

For example, iron oxide (III) is used in order to impart an olive green color to the glass under reducing conditions or else a blue-green color under oxidizing conditions.

In order to produce dark (black) glass, wide use is made of coloring compositions based on nickel oxide.

In particular, nickel oxide added in low amounts (usually at a concentration of about 1%) to a mixture of oxides of transition metals (manganese dioxide, chromium oxide and cobalt oxide) is added to the vitrifiable mixture in order to obtain a dark glass characterized by a color with tones ranging from blue to violet, to black.

The dark glass, essentially black, is greatly used in the production of food grade containers or containers for cosmetic and pharmaceutical use in order to protect the contents (such as food and/or drugs) from radiation having a wavelength of less than 500 nanometers (nm), in particular from ultraviolet radiation.

The use of coloring compositions containing nickel oxide renders the glassmaking process and the procedure for producing the coloring mixture itself very hazardous to the health of workers.

It is well known and also specified in the European Community tri classification that nickel is an element suspected of being a cause of cancer. In particular, prolonged or repeated exposure to nickel-based, compounds such as nickel oxide may provoke serious damage to various organs or strong allergic reactions on the skin.

For this reason, the use of nickel, or compounds containing it, is strictly regulated. In particular, the release of nickel is limited under the European Community REACH regulation N. 1907/2006, Annex XVII.

The use of nickel oxide on an industrial level entails a very lengthy and costly authorization procedure. Therefore, at present, the processes for producing nickel oxide-based glass colorants and the glass coloring processes that use these types of colorants involve a series of very restrictive rules that are inconvenient to follow.

For this reason, in the sector there is a greatly felt need to have a composition for coloring glass that is free of nickel oxide and can assure a dark color of the glass which is comparable to that obtained using the colorants presently available for this purpose.

The opportunity of having at one's disposition a nickel-free coloring composition for obtaining dark glass would above all avoid the costly and demanding bureaucratic procedures required for the use of a hazardous substance, such as nickel oxide.

Moreover, the use of a nickel-free coloring composition would enable the process for producing colored glass to be streamlined, since the expedients and/or operations tied to the use of a colorant containing nickel oxide would no longer be necessary.

For example, it would no longer be necessary to seal the equipment, just as authorization from the European Community would no longer be mandatory.

SUMMARY OF THE INVENTION

The present invention fits into this context and resolves the problems of the prior art with a coloring composition for glass comprising manganese dioxide ($MnO_2$), chromium oxide (III) ($Cr_2O_3$), cobalt oxide ($Co_3O_4$) and a glass medium.

Furthermore, the present invention regards the process for producing the coloring composition and the use thereof to impart a dark color, essentially black, to the glass.

DETAILED DESCRIPTION OF THE INVENTION

The composition for coloring glass of the present invention is characterized by the absence of compounds containing nickel, in particular it is devoid of nickel oxide, and in other words is a nickel-free composition which can be used to obtain dark (black) glass.

The composition of the present invention, despite being free of nickel oxide, advantageously allows a dark color of glass to be obtained which is comparable to or better than that obtained with the compositions containing nickel oxide currently used to color glass.

Moreover, being free of nickel oxide, the coloring composition of the present invention is not subject to the European Community REACH regulation N. 1907/2006 Annex XVII discussed above. Therefore, in addition to being safer, any process for producing colored glass that uses the coloring composition of the present invention will also be more economical since it will require no particular authorizations.

Finally, besides being free of nickel oxide, the composition of the present invention contains reduced amounts of cobalt oxide and chromium oxide compared to the glass colorants currently used.

Cobalt oxide, like nickel oxide, is a very costly product. Therefore, the coloring composition of the present invention is also more economical compared to those known in the art, since it is free of nickel oxide and characterized by low concentrations of cobalt oxide.

With regard to chromium oxide, this compound is very dangerous because when the chromium has an oxidation state of +6, it forms chromium trioxide, which is a highly toxic gaseous compound.

The composition of the present invention is characterized by a reduced concentration of chromium oxide compared to those known in the art and is thus also safer (there being a lower probability of chromium trioxide forming).

In a preferred embodiment of the invention, the composition comprises: 35-50% by weight of $MnO_2$, 4-10% by weight of $Cr_2O_3$, 0.5-1.5% by weight of $Co_3O_4$ and 40-60% of the glass medium.

The manganese dioxide ($MnO_2$) is preferably comprised in an amount equal to 40-45%.

The $Cr_2O_3$ is preferably comprised in an amount equal to 5-8% by weight.

The $Co_3O_4$ is preferably comprised in an amount equal to 0.8-1.2% by weight.

In a preferred embodiment, the composition comprises: 40-45% by weight of $MnO_2$; 5-0% by weight of $Cr_2O_3$, 0.8-1.2% by weight of $Co_3O_4$ and 45-55% of the glass medium.

The glass medium can be silica and/or at least one silicate. In particular, the at least one silicate is a sodium silicate, preferably selected from among sodium silicate 1:2 ($Na_2O*2SiO_2$), sodium silicate 1:3 ($Na_2O*3SiO_2$) and/or mixtures thereof.

Preferably, said at least one silicate is anhydrous.

In a particularly preferred embodiment of the invention, the glass medium comprises a mixture of sodium silicate 1:2 ($Na_2O*2SiO_2$) and sodium silicate 1:3 ($Na_2O*3SiO_2$) comprising 42-48% by weight of sodium silicate 1:3 and 2-8% by weight of sodium silicate 1:2.

The percentages are to be considered percentages by weight relative to the total weight of the coloring composition.

The cobalt oxide used for producing the coloring composition of the invention is preferably a mixture of CoO and $Co_2O_3$.

The chromium oxide ($Cr_2O_3$) for producing the coloring composition of the invention is preferably in powder or crystal form, more preferably in crystal powder form. The crystalline particles of chromium oxide have dimensions which preferably range from 3 to 10 microns.

According to a further aspect of the present invention, the composition for coloring glass is formulated as a powder or else as pellets, tablets or granules. The formulation in granules is particularly preferred.

A further aspect of the present invention relates to a process for granulating the coloring composition of the invention which comprises the following steps:
(i) providing a coloring mixture according to the present invention;
(ii) humidifying the coloring mixture;
(iii) reducing the mixture into granules;
(iii) humidifying the colorant granules; and
(iv) drying the granules.

In particular, step (i) involves mixing the raw materials necessary for the formulation of the coloring composition concerned in suitable amounts.

The raw materials can be metal oxides, in particular oxides of transition metals, and vitrifying, melting, stabilizing, refining and/or opacifying agents.

With particular reference to the present invention, $MnO_2$, $Cr_2O_3$, $Co_3O_4$ and the glass medium are mixed in the previously stated amounts.

Preferably, the coloring mixture is compacted before being reduced into granules.

Granulation is preferably achieved by crashing.

The humidification step is carried out in an atmosphere preferably comprising from 15 to 35% by weight of water, more preferably, from 20 to 30% by weight of water.

The drying step carried out at a temperature which preferably ranges between 150 and 300° C., more preferably, between 150 and 260° C.

The drying time preferably ranges between 5 and 30 minutes, more preferably, between 5 and 15 minutes.

The drying is preferably carried out under rotation, that is, it is carried out while the granules are being agitated so as to continuously change the surface exposed to the drying agent.

After the drying step, an additional step of sieving may be provided for.

The granules obtained with the above-described process have a density which is preferably equal to or greater than the density of the molten glass matrix.

In a preferred embodiment of the invention, the colorant granules obtained according to the present invention are characterized by a density which preferably ranges from 1 to 5 $g/cm^3$, more preferably, it ranges between 2 and 3 $g/cm^3$.

In a further preferred embodiment of the invention, the colorant granules have a dimension which preferably ranges between 1 and 15 mm, more preferably, between 2 and 10 mm.

In a further preferred embodiment of the invention, the colorant granules of the present invention are characterized by a humidity of less than 5% w/w, preferably less than 3% w/w, more preferably, less than 2% w/w.

The density of the granules according to the present invention enables a homogeneous distribution and/or mixing of the colorant in the molten glass matrix during the process of producing the colored glass. The homogeneous distribution and/or mixing of the colorant make it possible to obtain a rapid and uniform coloring of the glass. Glass with improved color assures a high quality of the final product, whatever it may be.

The coloring composition according to the Present invention, preferably in the form of granules, is used to color the glass by means of any procedure for producing colored glass.

Preferably, the process for producing colored glass according to the present invention comprises the following steps:
Providing a molten glass matrix;
Adding the colorant according to the present invention;
Forming the glass.

The melting of the glass is carried out at a temperature which preferably ranges between 1000 and 2000° C.; more preferably, it ranges between 1200 and 1600° C.

The colorant is added to the molten glass matrix at a concentration which preferably ranges between 1 and 6%, more preferably, between 3 and 6% by weight relative to the molten glass matrix.

The composition of the present invention can be added to the glass matrix on its own or else in combination with other coloring compositions for glass (for example, glass coloring compositions commonly known by the term frits can be used).

A further aspect of the present invention relates to a colored glass obtainable using the composition of the present invention.

Said glass is characterized by a light reflectance percentage comprised between 0 and 40, preferably between 0 and 30, more preferably between 0 and 20, even more preferably between 0 and 10.

In a particularly preferred embodiment of the invention, the glass obtained with the coloring composition of the invention has a very low light reflectance percentage, so that the glass is practically defined as black.

In the context of the present invention, light reflectance percentage (L) means a property of glass which indicates the amount of light reflected or absorbed by the glass and it ranges between a value of L=0, corresponding to black glass, and L=100, corresponding to glass that completely reflects visible light (white).

The subject matter of the present invention further relates to an article obtainable from the manufacture of colored glass according to the present invention.

Said article is preferably a container, for example a bottle, which can be of different capacities.

Said container is preferably utilized in the food and/or cosmetic industry. For example, said container can be utilized for liquor, wine, medicines or creams.

EXAMPLES

Granulation Process.

A composition containing 43% $MnO_2$, 6% $Cr_2O_3$, 1% $Co_3O_4$, 46% sodium silicate 1:3 ($Na_2O*3SiO_2$) and 4% sodium silicate 1:2 ($Na_2O*2SiO_2$) was prepared.

The ingredients were mixed in a paddle mixer/humidifier for a time of 5-10 minutes.

The mixture thus obtained was compacted into suppositories with the aid of a, rotary press.

The composition reduced into suppositories was subjected to a crashing step in a hammer mill.

The granules were subjected to a humidification step for 5 minutes at a humidity of 20% w/w.

The granules were dried for 10 minutes at 200-250° C. and finally subjected to a sieving step.

The granules thus obtained, were added in a 3% concentration to the transparent molten class mixture during the glass coloring process, Glass Coloring Process.

The glass mixture was melted in a melting furnace at a temperature of around 1200° C. It was subsequently allowed to pour into a channel.

The channel supports burners which have the purpose of maintaining the temperature around 1250° C. and thus maintaining the glass mixture in the molten state.

Moreover, in the channel there are present mixers, i.e. paddles which have the purpose of mixing the molten glass mixture.

In the melting channel there are present 4 rows of paddles set at a distance of 15 minutes from one another.

The system is likewise provided with a chopper, with gravimetric or volumetric weighing. The choppers dispense the granules, which fall into the molten glass mixture for coloring.

The paddles have the purpose of homogeneously mixing the molten glass mixture with the colorant.

After the mixing step, the forming step was carried out, accompanied by an abrupt lowering of the temperature and thus rapid cooling of the glass.

The strong mechanical tensions that form in the glass due to the rapid drop in temperature were eliminated by carrying out what is defined as an "annealing" step.

The annealing was carried out at a temperature of 600-700° C.

Finally, the colored glass obtained was allowed to cool slowly to room temperature.

The colored glass obtained with the composition of the present invention as described above was compared to glass obtained with the composition presently used to obtain the same color shade.

Commercial dark glass is made with a composition containing 1% nickel oxide.

The results obtained show that the composition of the present invention enables a color of glass to be obtained which is equal to or even darker than the one obtained with the composition currently present on the market and containing nickel oxide.

Analysis of the Glass.

A sample of glass was produced by adding the composition according to the present invention at 1% into a molten glass mixture according to the procedure described above.

The glass was analyzed using a Minolta CM2500D laboratory colorimeter, which reads in reflection, and the actual color of the glass sample was measured.

The results of the analysis are shown in Table 1,

TABLE 1

| Illuminant D65 | | |
|---|---|---|
| L | a | B |
| 40.51 | 8.29 | −7.10 |

L = Light reflectance percentage
a = color coordinates (a positive value indicates the % of red, a negative one the % of green)
b = color coordinates (a positive value indicates the % of yellow, a negative one the % of blue)
A 8.29 = red; B −7.10 = blue.

I claim:

1. A coloring composition for glass, free of nickel oxide, comprising:
   35-50% by weight of $MnO_2$;
   4-10% by weight of $Cr_2O_3$;
   0.5-1.5% by weight of $Co_3O_4$; and
   40-60% of a glass matrix.

2. The composition in accordance with claim 1, comprising:
   40-45% by weight of $MnO_2$;
   5-8% by weight of $Cr_2O_3$;
   0.8-1.2% by weight of $Co_3O_4$; and
   45-55% of a glass matrix.

3. The composition in accordance with claim 1, wherein said glass matrix is silica, a silicate, or an anhydrous silicate.

4. The composition in accordance with claim 3, wherein said at least one silicate is a sodium silicate.

5. The composition in accordance with claim 1, wherein said glass matrix comprises 42-48% sodium silicate 1:3 by weight relative to the glass medium or 2-8% sodium silicate 1:2 by weight relative to the glass matrix.

6. The composition in accordance with claim 1, wherein the chromium oxide is in the form of a powder, crystals or crystal powder.

7. The composition in accordance with claim 1 in powder form, or in the form of pellets, tablets or granules.

8. A process for producing the composition according to claim 1, in the form of granules, said process comprising the following steps:
   (i) providing a composition for coloring glass according to claim 1;
   (ii) humidifying the coloring composition;
   (iii) reducing the composition into granules;
   (iv) humidifying the colorant granules; and
   (v) drying the granules.

9. The process according to claim 8, wherein the humidification step is carried out in an atmosphere comprising from 15 to 35% by weight of water.

10. A granule of the composition according to claim 1, wherein the granule has a density which ranges from 1 to 5 $g/cm^3$, a size which ranges between 1 and 15 mm, and a humidity of less than 5% w/w.

11. A colored glass made from the composition of claim 1, having a light reflectance percentage of between 0 and 40.

12. A colored glass made from the granule according to claim 10, characterized by a light reflectance percentage of between 0 and 40.

13. A process for producing colored glass, comprising the following steps:
   (i) providing a molten glass matrix;
   (ii) adding a composition according to claim 1; and
   (iii) forming the glass.

14. A food or cosmetic grade article, comprising colored glass according to claim 13.

15. A process in accordance with claim 14, wherein said composition or granule is added at a concentration which ranges between 1 and 6%, relative to the molten glass matrix.

16. The composition in accordance with claim 4, wherein said sodium silicate is selected from the group consisting of sodium silicate 1:2 ($Na_2O*2SiO_2$), sodium silicate 1:3 ($Na_2O*3SiO_2$) and mixtures thereof.

17. The composition in accordance with claim 1, wherein the chromium oxide has a particle size ranging from 3 to 10 microns.

18. The process in accordance with claim 9, wherein the atmosphere comprises from 20 to 30% by weight water.

19. The granule of the composition according to claim 10, having a density which ranges between 2 to 3 $g/cm^3$.

20. A granule of the composition according to claim 10, having a size which ranges between 2 and 10 mm.

\* \* \* \* \*